June 7, 1938. G. MANCINELLI 2,119,995
SOLDER WIRE FEEDING MEANS FOR SOLDERING IRONS
Filed Nov. 27, 1935
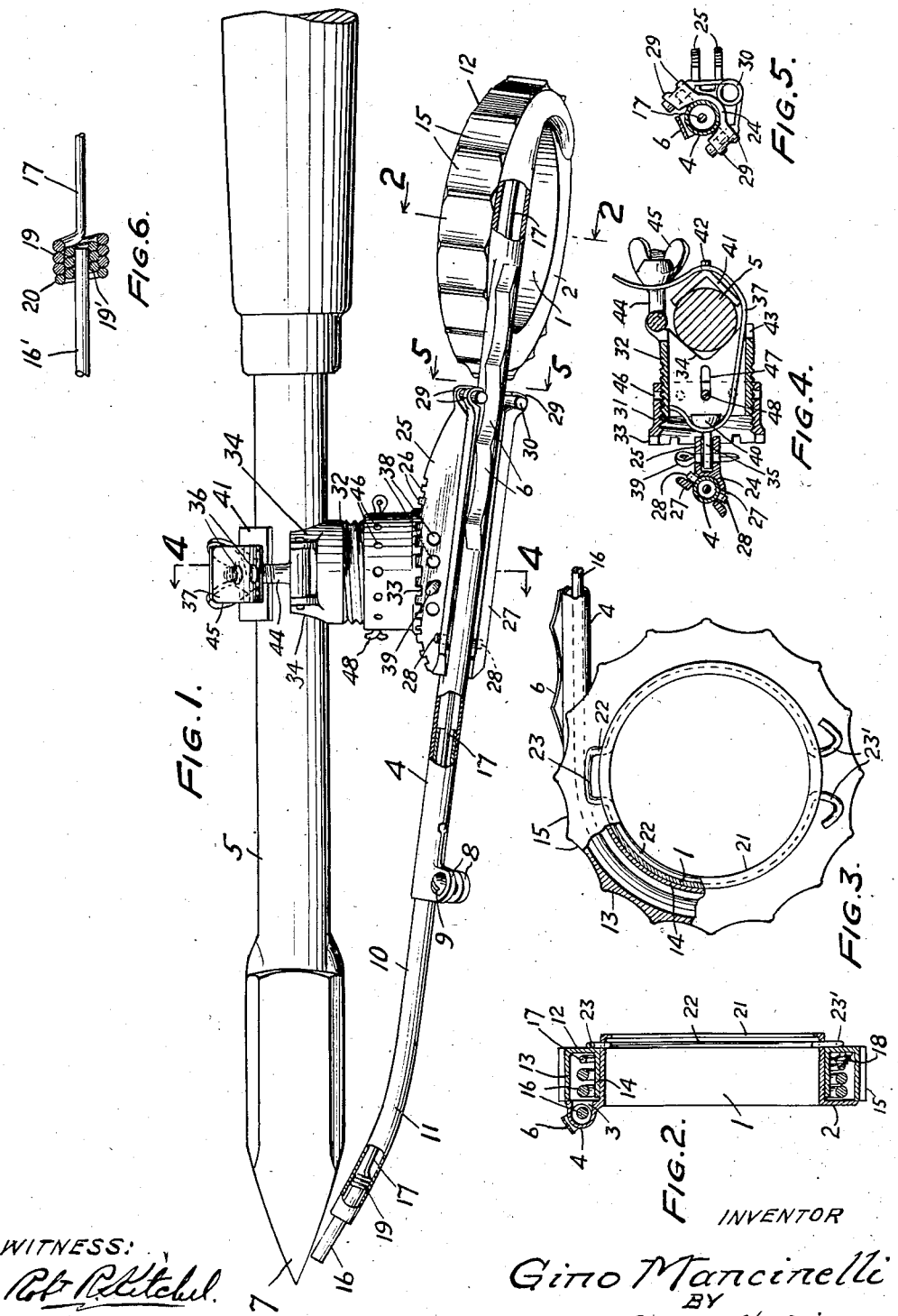
INVENTOR
Gino Mancinelli
BY
Busser Harding
ATTORNEYS.
WITNESS:
Rob R Mitchel Patented June 7, 1938

2,119,995

UNITED STATES PATENT OFFICE 2,119,995

SOLDER WIRE FEEDING MEANS FOR SOLDERING IRONS

Gino Mancinelli, Wilmington, Del.

Application November 27, 1935, Serial No. 51,743

6 Claims. (Cl. 113—109)

It is a general object of the invention to provide a simple device, that can be manufactured at small cost, which can be attached to the shank of any conventional type of soldering iron and by which, through the manipulation of the thumb of the hand holding the soldering iron, a solder wire may be projected to the heated end of the soldering iron to provide the supply of solder necessary for the work to be done, which solder wire may be completely projected, including its end, so that there is involved no loss of any portion thereof. The use of the improved device enables the soldering operation to be accomplished with one hand under conditions where both hands have been heretofore required, thus simplifying the operation, especially when soldering is being done in a restricted space.

Other objects of the invention relate to the provision of means for readily attaching and removing the device from the shank of the soldering iron and to means for retracting and adjusting the solder wire guiding means in accordance with the desires of the operator.

The above and other objects of the invention, particularly relating to details of construction, will be apparent from the following description read in conjunction with the accompanying drawing, in which:

Figure 1 is a perspective view with certain portions broken away showing the improved device applied to a soldering iron;

Figure 2 is a section taken on the plane indicated at 2—2 of Figure 1;

Figure 3 is a plan view, partially in section, showing certain details of the solder wire holder;

Figure 4 is a section taken on the plane indicated at 4—4 in Figure 1;

Figure 5 is a section taken on the plane indicated at 5—5 in Figure 1; and

Figure 6 is an enlarged sectional view showing a modified form of solder wire feeder.

In the embodiment of the invention shown, there is provided a stationary annulus 1 having a laterally disposed flange 2 provided with an opening at 3 communicating with which there is a tangentially attached conduit tube 4 adapted to extend in the general direction of the shank 5 of a soldering iron, as indicated in Figure 1. The top of the conduit 4 is provided with thumb seats or corrugations 6 as indicated in Figures 1 and 3. The conduit tube 4 extends to a point adjacent the head 7 of the solder iron and is there split and provided with space lugs 8 arranged to be drawn together by a connecting screw 9 to clamp an extension tube 10 within the end of the tube 4. The extension tube 10 is curved as indicated at 11, which curvature, together with the axial adjustment of the extension 10, provides means for locating the outlet of the extension tube 10 in a suitable position to deliver the solder to the tip 7 of the soldering iron.

A drum 12 is rotatably mounted on the annulus 1 and comprises a U-shaped ring having concentric outer and inner walls 13 and 14, respectively, to provide an annulus opening in a direction parallel to its axis. The periphery of the drum 12 is provided with thumb seats or corrugations 15 to facilitate turning of the drum by means of the thumb of the hand holding the soldering iron. By such means the drum may be rotated in opposite directions so as to push or pull the feeder 17 and solder wire 16 through its annular opening and through the opening 3, conduit 4 and extension 10 to and from the tip 7 of the soldering iron.

The feeder 17 is secured at 18 inside the drum 12 and preferably consists of spring wire provided with a coil 19 at its forward end, as indicated in Figures 1 and 6. This feeder may be projected by the manipulation of the thumb to the outlet of the tube 10, as shown in Figure 1. The feeder may consist either of a wire, as shown, or a long cylindrical spring wire coil of convenient size.

If a large solder wire is being used, the solder wire may be forced by rotation into the coil 19 of the feeder 17, and since it is of soft material will be gripped thereby so that it may be pushed entirely in or out of the conduit tubes in the charging or discharging operations. In Figure 1 the feeder wire 17 is shown approaching its extreme outer position, which involves the location of the spiral 19 outside the tube 10. As a result of this capability of movement, the entire soldering wire may be fed to the tip of the iron so that there will be no waste of short lengths.

If a thin solder wire such as 16' is used, an insert coil 19' may be provided adapted to thread into the coil 19 and in turn adapted to receive the solder wire 16'. Preferably, the coil 19' is provided with an enlarged turn 20 at its end to serve as a stop and limit its movement inwardly to the coil 19.

The annulus 1 is provided with a circumferential inturned flange 21 which is apertured at two opposite points for the reception of the portions 23 and 23' of a split ring 22. This ring, located between the flange 21 and the drum 12, serves to retain the drum in proper axial relationship with the annulus 1 so that the drum may turn thereon without becoming displaced. In case occasion arises for the use of the soldering iron in restricted space it may be desirable to retract the assembly consisting of the elements 1, 12, 4 and 10. In order to permit either removal or retraction of these elements, there is provided a supporting channel 24 within which the tube 4 is adapted to be seated. The upper edges of the channel 24 are provided with longitudinal slots 27 within which slots there may ride pins 28 projecting laterally from tube 4, the pins 28 being adapted to steady and laterally align within the channel the tube 4 and its associated elements. The pins 28 also provide end stops for the back and forth movements of this assembly which may result from manipulation by the thumb of the hand holding the soldering iron by pushing or pulling on the corrugations 6 of the conduit 4.

As illustrated in Figures 1 and 5, the supporting channel 24 is provided with end offsets 29 serving as apertured ears for the reception of the U-shaped spring clip 30 which may be inserted through the openings therein. If the U-shaped clip is removed from the ears 29, the assembly may be slid backwardly bringing the pins 28 in line with these ears so as to be removable outwardly, thus freeing the conduit 4 and its associated parts from the channel.

The assembly just mentioned is also adapted to be universally adjustable relative to the soldering iron to suitably locate the elements thereof with respect to the axis of the iron. To provide such adjustment there are provided an outer internally threaded tube 31 and an inner externally threaded tube 32, the threads of the two tubes being arranged to engage, as indicated in Figure 4. The supporting channel 24 is provided with segmental flanges 25 provided with teeth 26 at their curved edges, as indicated in Figure 1. The outer portion of the tube 31 is provided with teeth 33 engageable with the members 25 to the teeth thereof to insure a firm grip between the channel 24 and the tube 31. It will be obvious that this will provide two annular adjustments of the assembly, one by tilting the members 25 with respect to the toothed end of the tube 31 about the axis perpendicular to the axis of the tube 31 and the other by rotating the members 25 about the axis of the tube 31. The channel 24 is secured to the tube 31 by means described below.

The base portion of the tube 32 is preferably squared so as to increase its stiffness and is notched at 34, 34 to embrace the shank of any soldering iron.

An eyelet 35 is disposed through a hole 36 in a conventional perforated metal strip clamp 37 provided with a number of such holes 36. The member 35 acts as a universal joint between the members 25 and the clamp 37, being provided with an opening in one end adapted to be aligned with any one of the openings 38 of the members 25 and secured in such alignment by means of a cotter pin 39. The member 35 is provided with a hemispherical head 40 which sits within the upper curved portion of the clamp member 37, as indicated in Figure 4. It will be clear from this construction that there is considerable freedom of movement, when the clamp member is freed the hemispherical head of the member 35 taking care of slight angular displacements.

A saddle 41 is arranged to partially embrace the portion of the soldering iron shank opposite the member 32 and is provided with a pin 42, as illustrated in Figure 4, projecting through a convenient hole 36 of the strip metal clamp 37, which projects from the lower edges of member 32 through notch 43. By tightening a wing nut 45 on a pivoted bolt 44, extending through one of the holes 36 of the clamp 37, the entire device will be firmly attached to the shank 5, with the various parts held in adjusted position.

In order to prevent relative displacement of the tubes 31 and 32 there are provided a number of diametrically spaced holes 46 in the member 31 and opposite diametrically located longitudinal slots 47 in the member 32. Through any pair of the holes 46 and the slots 47 there may be arranged a cotter pin 48 to hold these tubes in relatively fixed position.

It will be understood that various changes may be made in details of the invention without departing from its scope as defined in the following claims.

I claim:

1. Means for feeding solder wire to the tip of a soldering iron comprising a support securable to a soldering iron, a member rotatable on the support for carrying a coil of solder wire, means for guiding the soldering wire to the soldering iron tip, and means rotatable with the member for pushing the rear end of the solder wire, said last named means comprising a flexible wire arranged to push the rear end of the solder wire substantially to the soldering iron tip.

2. Means for feeding solder wire to the tip of a soldering iron, comprising a support securable to a soldering iron, inner and outer wall forming members mounted on the support and providing an annular channel opening in a direction parallel to its axis, said annular channel being arranged to receive the solder wire, at least the outer wall-forming member being rotatable, and means for guiding the solder wire over the outer wall-forming member to the soldering iron tip.

3. Means for feeding solder wire to the tip of a soldering iron, comprising a support securable to a soldering iron, inner and outer wall-forming members mounted on the support and providing an annular channel opening in a direction parallel to its axis, said annular channel being arranged to receive the solder wire, at least the outer wall-forming member being rotatable, means for confining coils of solder wire within the annular channel, and means for guiding the solder wire over the outer wall-forming member to the soldering iron tip.

4. Means for feeding solder wire to the tip of a soldering iron, comprising a support securable to a soldering iron, inner and outer wall-forming members mounted on the support and providing an annular channel opening in a direction parallel to its axis, said annular channel being arranged to receive the solder wire, at least the outer wall-forming member being rotatable, and means for guiding the solder wire over the outer wall-forming member to the soldering iron tip, and means rotatable with the outer wall-forming member for pushing the trailing end of the solder wire.

5. Means for feeding solder wire to the tip of a soldering iron, comprising a support securable to a soldering iron, inner and outer wall-forming members mounted on the support and providing an annular channel opening in a direction parallel to its axis, said annular channel being arranged to receive the solder wire, at least the outer wall-forming member being rotatable, and means for guiding the solder wire over the outer wall-forming member to the soldering iron tip, and means rotatable with the outer wall-forming member for pushing the trailing end of the solder wire, said last named means comprising a flexible wire arranged to push the trailing end of the solder wire substantially to the soldering iron tip.

6. Means for feeding solder wire to the tip of a soldering iron comprising a support securable to a soldering iron, a member rotatable on the support for carrying a coil of solder wire, means for guiding the solder wire to the soldering iron tip, and means rotatable with the member for pushing the rear end of the solder wire, said last named means comprising a flexible wire arranged to push the rear end of the solder wire substantially to the soldering iron tip, and to grip the solder wire to pull it backwardly through the guiding means.

GINO MANCINELLI.